United States Patent [19]
Kim

[11] Patent Number: 6,104,445
[45] Date of Patent: Aug. 15, 2000

[54] MONITOR HOUSING WITH INTEGRAL RACK FOR STORING RECORDING MEDIA

[75] Inventor: Bong-Seok Kim, Suwon, Rep. of Korea

[73] Assignee: SamSung Electronics Co., Ltd., Kyungki-do, Rep. of Korea

[21] Appl. No.: 09/176,931

[22] Filed: Oct. 23, 1998

[30] Foreign Application Priority Data

Oct. 23, 1997 [KR] Rep. of Korea ................... 97-54447

[51] Int. Cl.[7] .................................................. H40N 5/64
[52] U.S. Cl. .................... 348/836; 211/40; 211/41.12; 312/223.2
[58] Field of Search .................. 312/223.1, 223.2, 312/7.2; 211/40, 41.12; 348/836, 826

[56] References Cited

U.S. PATENT DOCUMENTS

| | | | |
|---|---|---|---|
| 2,670,261 | 2/1954 | Mueller | 211/40 X |
| 5,289,925 | 3/1994 | Newmark | 211/40 |
| 5,335,795 | 8/1994 | Chizen | 211/41.12 |
| 5,458,408 | 10/1995 | Cooper et al. | 312/213 |
| 5,558,235 | 9/1996 | Hunt | 211/40 |
| 5,564,802 | 10/1996 | Chiou | 312/223.1 X |
| 5,737,189 | 4/1998 | Kammersgard et al. | 312/223.2 X |
| 5,828,545 | 10/1998 | Loudenslager | 211/40 X |
| 5,833,331 | 11/1998 | Chang | 312/223.2 |
| 5,894,878 | 4/1999 | Morgan et al. | 312/7.2 X |

*Primary Examiner*—Peter M. Cuomo
*Assistant Examiner*—Stephen Vu
*Attorney, Agent, or Firm*—Robert E. Bushnell, Esq.

[57] ABSTRACT

A monitor with an integrally formed storage rack can hold a variety of recording media, will be economical to produce, will not increase the amount of desk space required by the monitor, will reduce clutter at computer work station, and will reduce the amount of misplaced or lost recording media. If a user wants to store recording media having a different thickness or wishes to have a precise fit for existing recording media, then the two plates can simply be exchanged for plates having bars spaced along the bars at an appropriate interval.

27 Claims, 6 Drawing Sheets

MONITOR HOUSING WITH INTEGRAL RACK FOR STORING RECORDING MEDIA

CLAIM OF PRIORITY

This application makes reference to, incorporates the same herein, and claims all rights accruing thereto under 35 U.S.C. §119 through my patent application entitled Display Device Capable of Holding Recording Media earlier filed in the Korean Industrial Property Office on the Oct. 23, 1997 and there duly assigned Ser. No. 1997/54447.

BACKGROUND OF THE INVENTION

1. Field of the Invention

The present invention relates to monitors and, more specifically, to recording media storage racks that are integrally constructed with monitors.

2. Background Art

Today, it is common for computer systems to be equipped with both a compact disk read only memory drive and a digital video disk drive, to enhance the functionality of the computer system. In addition, both audio-compact disks and video-compact disks are utilized by computer systems that have multimedia capabilities.

Monitor housings are commonly used that have speakers integrated to enhance performance while reducing clutter. Still, with the amount of accessories, such as pens, pencils, and notepads, that are used while operating a computer system, clutter often results in items being lost or misplaced. To reduce the clutter that often occurs at computer stations different methods of keeping items organized have been developed. Some devices used with computer systems to reduce clutter are shown, for example, in U.S. Pat. No. D395,293 to Kirby entitled Attachable Accessory Organizer for Computer Monitor and U.S. Pat. No. D5,336,197 to Wilcox entitled Accessories Storage Rack for Attachment to a Computer Monitor.

Still clutter often occurs because of the amount and variety of recording media that are commonly used with computers. In addition, the use of separate storage racks for various storage media often uses up valuable desk space. As such, I believe that it may be possible to improve on the contemporary art by providing a monitor that has an integrally formed storage rack, that can hold a variety of recording media, that is economical to produce, that does not increase the amount of desk space required by the monitor, that reduces clutter at computer work station, and that reduces the amount of misplaced or lost recording media.

SUMMARY OF THE INVENTION

Accordingly, it is an object of the present invention to provide an improved monitor housing.

It is another object to provide a monitor housing that has an integrally formed rack for storing recording media.

It is still another object to provide a monitor housing that has an integrally formed rack for storing media and requires no more desk space than a typical monitor housing.

It is yet another object to provide a monitor housing and storage rack that is economical to produce.

It is still yet another object to provide a monitor that can store a variety of recording media.

It is a further object to provide a monitor housing that reduces clutter at a computer work station.

It is a further object still to provide a monitor housing that reduces the amount of misplaced or lost recording media.

It is a further object yet to provide a monitor housing with an integrally formed storage rack for recording media that can be easily adjusted to accommodate recording media of significantly different size.

To achieve these and other objects, a monitor housing is provided that may be constructed with a multitude of slots in the housing's top side. These slots run in a direction perpendicular to the face of the screen of the monitor. Recording media can be inserted in the slots for easy storage, thus allowing a user to quickly locate the desired compact disk read only memory disk, digital video disk, audio-compact disk, or video-compact disk.

A second embodiment of the monitor housing with an integral storage rack as constructed according to the principles of the present invention may also be constructed with a multitude of slots located in the top side of the monitor housing. The slots extend through the front side of the monitor to allow a user to slide the recording media into place rather than having to lift the recording media over the front of the housing to vertically insert the recording media into the monitor housing. The second embodiment also allows a user to read labels on the side of the recording media containers with greater ease since an end of the slot is open on the front side of the monitor housing.

The third embodiment of the present invention has the advantage of being interchangeable to accommodate different spacing of the gaps in the rack that are used to store recording media. The monitor housing has a pocket in the top side that also has a groove, or slit, in each corner. Two plates, or inserts, can be inserted in the pocket along either the front side or the rear side of the pocket. Each plate has both ends inserted in a groove in a corner of the pocket. This allows the plates to be easily removed and attached to the monitor. Each plate has bars, or posts, attached along intervals to support recording media that is inserted between the posts. If a user wants to store media having a different thickness and wishes to have a precise fit, then the two plates can simply be exchanged for plates having bars spaced along the bars at an appropriate interval.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
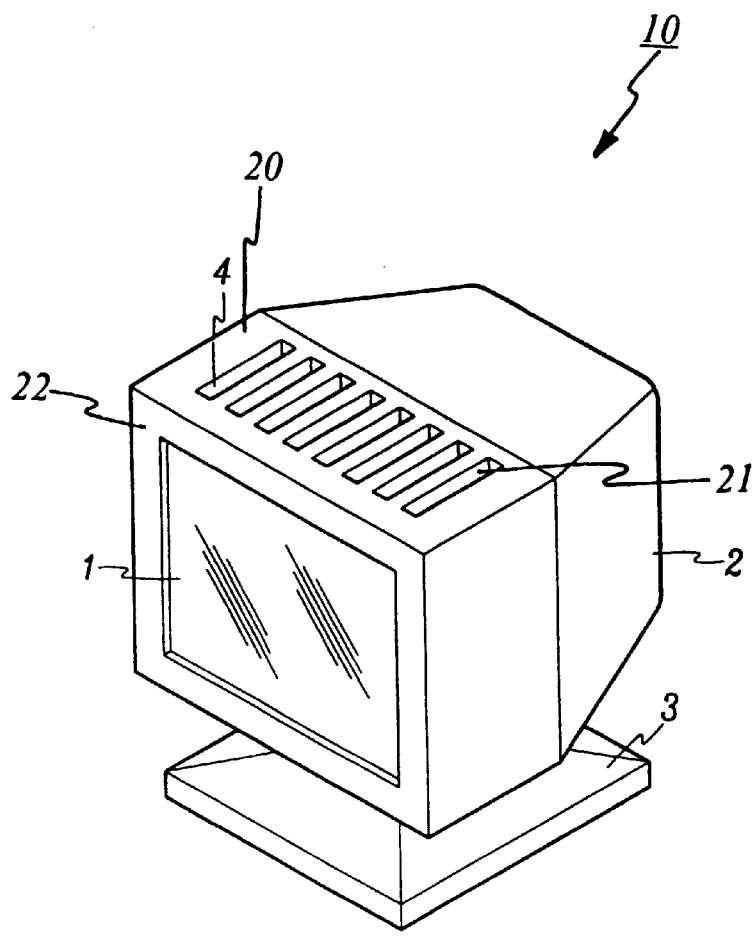
FIG. 1 is a perspective view of a monitor with an integrated rack for storing recording media as constructed according to the principles of the first embodiment of the present invention.

Turning now to the drawings, FIG. 1 illustrates a monitor as constructed according to the principles of the first embodiment of the present invention. Monitor 10 is capable of holding recording media (not shown) and may be constructed using display means 1 for displaying variable visual images as a result of various inputs that can be generated from a computer system. Housing 2 covers display means 1 and rack 4 is integrally formed in top side 20 of housing 2. Rack 4 may be constructed by slots 21 that are perpendicular to front side 22 of the housing.

Figure 2:
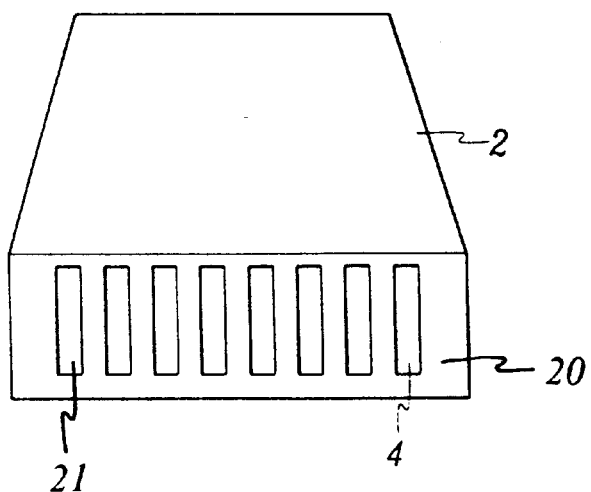
FIG. 2 is a plane view of the monitor of FIG. 1.
Figure 3:
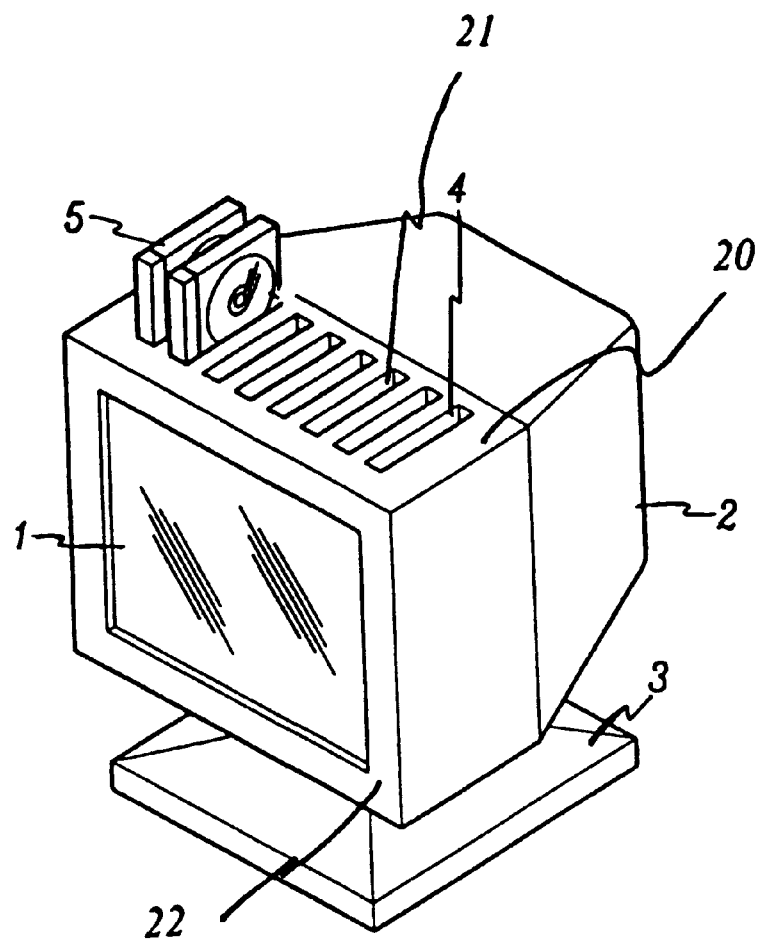
FIG. 3 is a perspective view of the monitor of FIG. 1 with various recording media stored in the integrated storage rack.

As also shown in FIGS. 2 and 3, display means 1 is exposed for a viewer to observe through front side 22 of housing 2. Base 3 supports housing 2 and allows the housing to be rotated to facilitate comfort for the user. Rack 4 is integrally moulded in top side 20 of housing 2 and is constructed using numerous slots 21. The slots can be designed to have a width and length that is ideal for the desired recording media. Thus, recording media can be inserted into the slots for easy storage. Furthermore, by storing the recording media on the monitor, a user is able to quickly locate the desired compact disk read only memory disk, digital video disk, audio-compact disk, or video-compact disk. Slots 21 are constructed with a depth adequate to prevent the recording media to remain in the slots while the monitor is being adjusted. As shown in FIG. 3, recording media 5 can be held in slots 21 of rack 4 so as to be easily accessible for a user. Rack 4 is located in top side 20 of housing 2.

Figure 4:
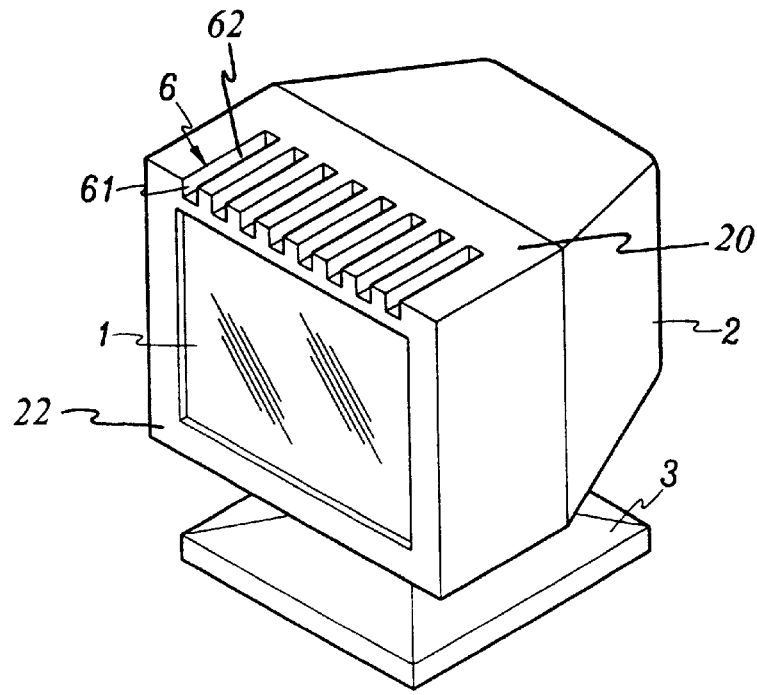
FIG. 4 is a perspective view of a monitor with an integrated rack for storing recording media as constructed according to the principles of the second embodiment of the present invention.
Figure 5:
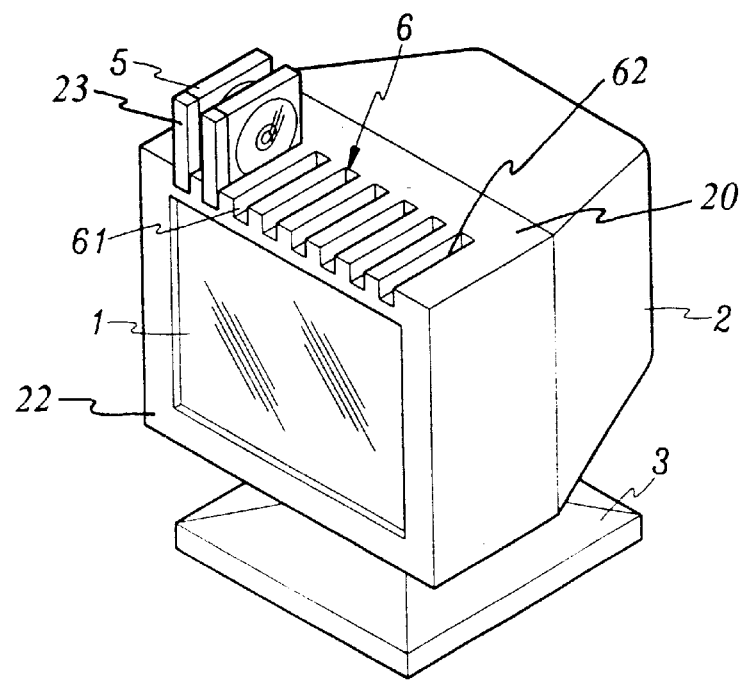
FIG. 5 is a perspective view of the monitor of FIG. 4 with various recording media stored in the integrated storage rack.
Figure 6:
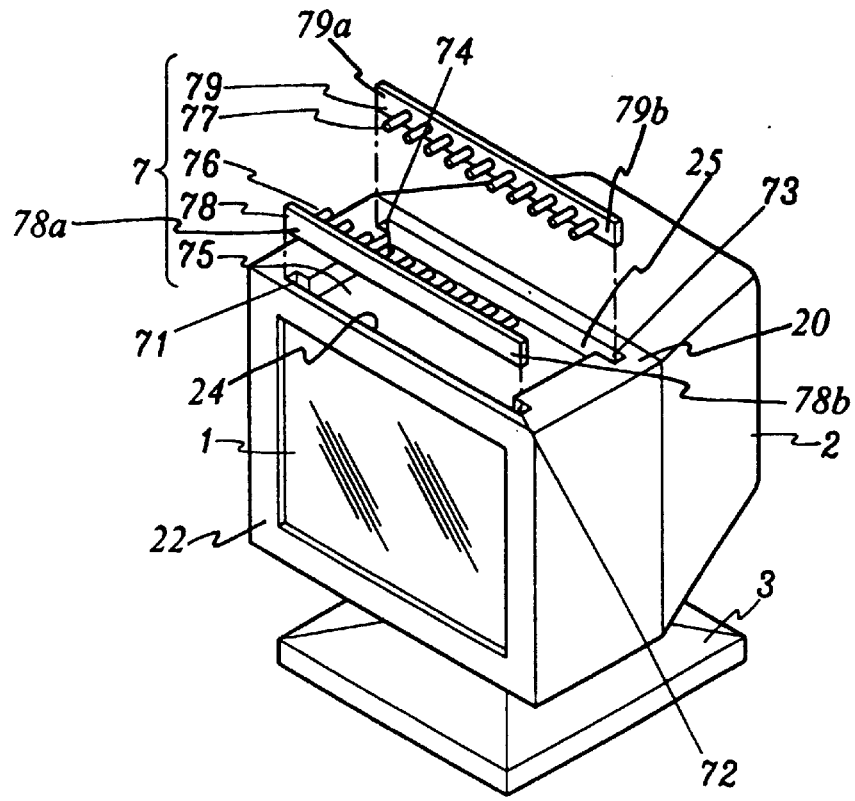
FIG. 6 is an exploded view of a monitor as constructed according to the principles of the third embodiment of the present invention.
Figure 7:
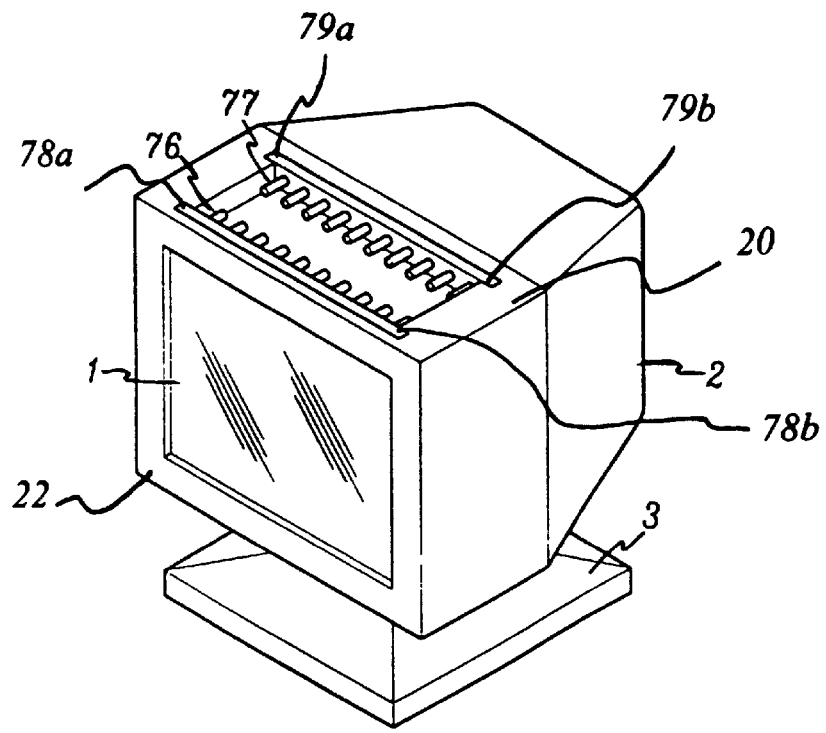
FIG. 7 is a perspective view of the monitor of FIG. 6.

A monitor housing as constructed according to the principles of the second embodiment of the present invention is shown in FIGS. 4 and 5. Monitor housing 2 is capable of holding recording media 5 in slots 62. Housing 2 may be constructed to contain display means 1 that is used to display variable visual images. Rack 6 is integrally formed with top side 20 to hold recording media 5 on upper side 20 of housing 2 while exposing side 23 of recording media 5 through openings 61 in front side 22 of housing 2. Display means 1 may be constructed using a cathode ray tube, or a liquid crystal display (not shown), and associated electrical components. Stand 3 supports housing 2 and allows the monitor to be adjusted to a user's preferences. The width and length of slots 62 are designed to hold the desired recording media 5 in a manner that will prevent accidentally dislodging the recording media while adjusting the monitor. Thus, as shown in FIG. 5, the user can easily insert recording media 5 in the slots 62 via openings 61 in front side 22 of housing 2.

A monitor housing and integrated rack as constructed according to the principles of the third embodiment of the present invention is shown in FIGS. 6 through 8a. Housing 2 encloses display means 1 that displays variable visual images. Rack 7 is integrally moulded with top side 20 of housing 2. Rack 7 may be constructed using pocket 75, that has a substantially rectangular shape, that is recessed into the top side of the housing. In each corner of the pocket is one of four grooves 71, 72, 73, and 74 that are positioned so as to slidably engage plates 78 and 79. Plates 78 and 79 can be slid into position against either front side 24 of pocket 75 or rear side 25 of pocket 75. Bars, or posts, 77 and 76 are located on both plates along a spaced interval to support recording media that can be inserted between bars 76 and 77. Stand 3 supports housing 2 and allows a user to easily adjust the position of the monitor.

Figure 8A:
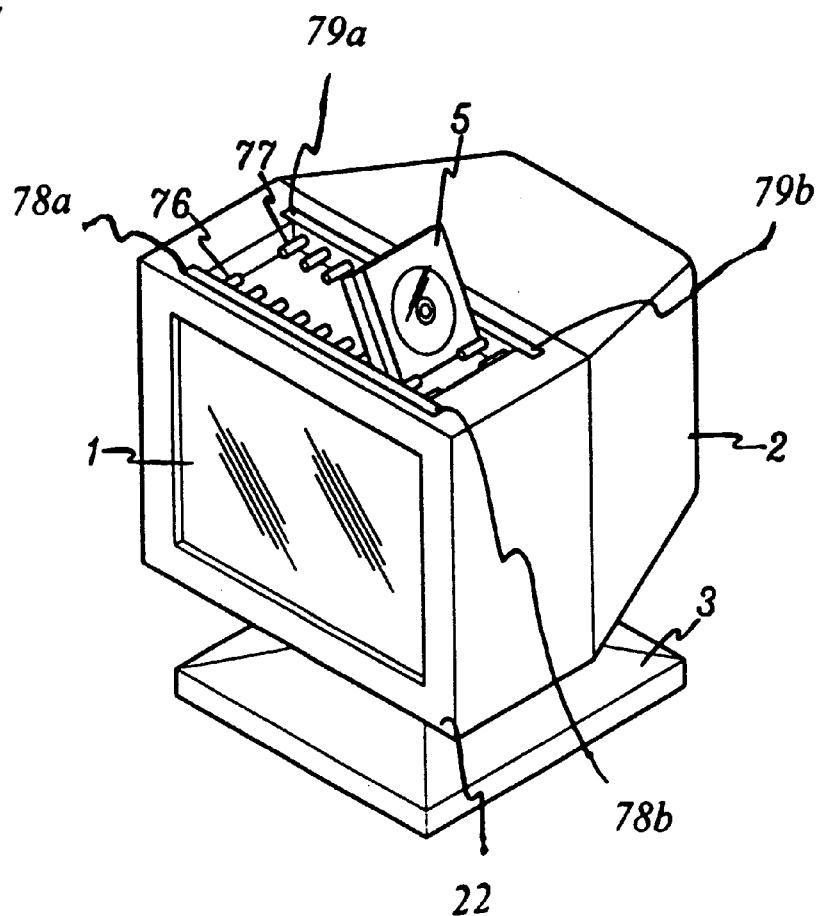
FIG. 8a is a perspective view of the monitor of FIG. 6 with various recording media stored in the integrated storage rack.
Figure 8B:
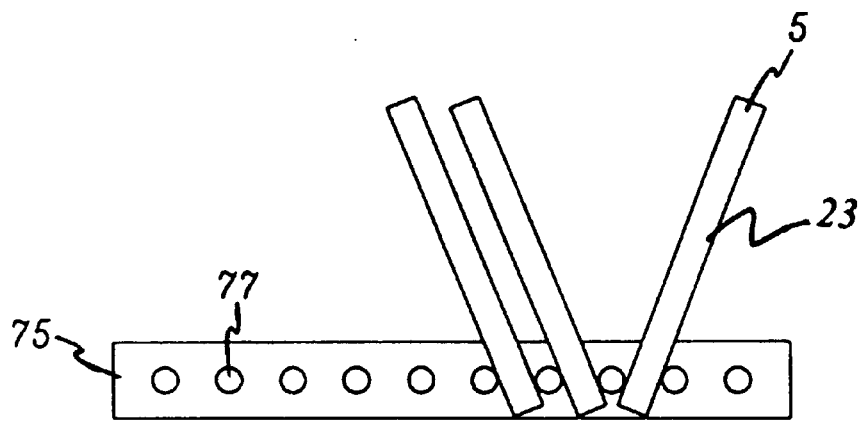
FIG. 8b is an expanded view of a plate, and associated bars that are supporting various recorded media, that is used in conjunction with the monitor of FIG. 6.

Rack 7 is integrally formed on upper side 20 of housing 2. Rack 7 is assembled by inserting end 78a of plate 78 into groove 71 and by inserting end 78b of plate 78 into groove 72. This positions half of the bars to support various recording media. To assemble the opposing bars, one inserts end 79a of plate 79 into groove 74 and end 79b of plate 79 into groove 73. Thus, when front and rear plates 78 and 79 are engaged with pocket 75, guide bars 76 and 77 protrude inward in pocket 75. The opposing guide bars allowing recording media to be supported between the bars, or posts. Pocket 75 may be designed with a width and length so as to fit any desired recording media 5, while the depth may be designed to prevent the accidental falling of recording media off of the housing. Additionally, the plates can easily be interchanged with another set by a user when a recording media of different thickness is going to be stored on the monitor. This flexibility allows a user to precisely configure the interval between the guide bars, to accommodate how precisely a user wants the media to fit or to accommodate a change in the size of recording media used by a user. FIG. 8a shows recording media 5 held by rack 7 and FIG. 8b illustrates just one plate and various recording media interspersed between the bars.

Figure 9:
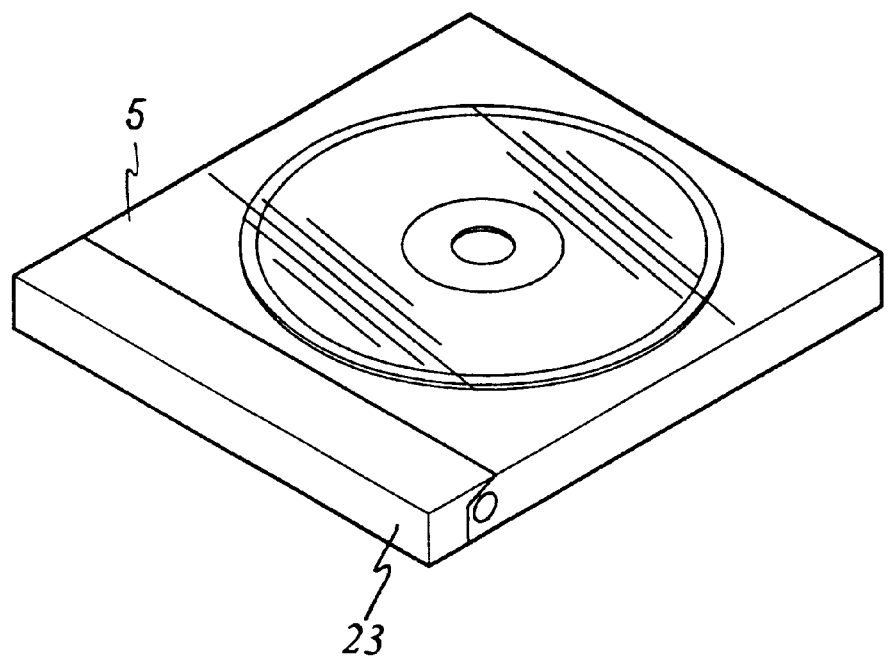
FIG. 9 is a perspective view of one type of a recordable media case.

FIG. 9 one possible type of disk housing used with recording media 5.

As described above, a monitor with an integrally formed storage rack can hold a variety of recording media, will be economical to produce, will not increase the amount of desk space required by the monitor, will reduce clutter at computer work station, and will reduce the amount of misplaced or lost recording media.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A display apparatus, comprising:

a housing having a side;

means encased by said housing for displaying a variable visual image on a screen bordered by said side; and a rack integrally formed on a surface of said side of said housing, said rack having a floor and a plurality of slots forming a spaced array extending across said floor.

2. The apparatus of claim 1, further comprised of said slots being rectangular shaped slots in said side of said housing for accommodating storage of a plurality of recording media.

3. The apparatus of claim 2, further comprised of said slots adapted to precisely fit said recording media and having a depth that prevents said recording media from falling from said monitor when said monitor is adjusted.

4. The apparatus of claim 1, further comprised of said side providing a top of said housing with said slots having a distal end forming an opening on a front side of said rack for allowing the recording media to be slid into place into corresponding said slots on said top of said housing.

5. The apparatus of claim 4, further comprised of said slots adapted to precisely fit said recording media and having a depth that prevents said recording media from falling from said monitor when said monitor is adjusted.

6. The apparatus of claim 1, with said rack comprising:

a recess defining a pocket in said side, said pocket having substantially a rectangular shape and having at least one groove; and a plate positioned in said pocket, said plate secured against a side of said pocket by said groove, said plate having a plurality of bars integrally formed on one side of said plate defining said plurality of slots, wherein individual containers of recording media are separately insertable into said slots between said bars.

7. The apparatus of claim 6, further comprised of said slots adapted to precisely fit said recording media and having a depth that prevents said recording media from falling from said monitor when said monitor is adjusted.

8. The apparatus of claim 6, further comprising the recording media to be held in said rack being laterally movable inside of said pocket.

9. The apparatus of claim 6, with said plate being changeable with another set of plates to change a spacing interval between said bars.

10. A display apparatus, comprising:

a housing having a top side;

means encased by said housing, for displaying a variable visual image on a screen bordered by said side; and a rack integrally formed into said top side of said housing to hold a plurality of recording media, said rack comprising a floor and a plurality of rectangular shaped slots in said top side of said housing forming a spaced array extending across said floor for accommodating individual storage of the recording media, each of said slots having a spacing interval substantially same as the thickness of the recording media.

11. The apparatus of claim 10, further comprised of said slots adapted to precisely fit said recording media and having a depth that prevents said recording media from falling from said monitor when said monitor is adjusted.

12. A display apparatus, comprising:

a housing having a top side;

means encased by said housing, for displaying a variable visual image on a screen bordered by said side; and a rack integrally formed into said top side of said housing to hold a plurality of recording media in a spaced array, said rack comprising a floor and a plurality of slots in said side of said housing forming a spaced array extending across said floor, said slots having a distal end forming an opening on a front side of said rack to allow sliding insertion and removal of individual units of the recording media on top of said housing.

13. The apparatus of claim 12, further comprised of said slots adapted to precisely fit said recording media and having a depth that prevents said recording media from falling from said monitor when said monitor is adjusted.

14. A display apparatus, comprising:

a housing having a side;

means encased by said housing for displaying a variable visual image on a screen bordered by said side; and a rack formed into said side of said housing to hold a plurality of recording media, said rack comprising:

a recess defining a pocket in said side, said pocket having a substantially rectangular shape, having a floor and having at least one groove;

at least one plate positioned in said pocket and being secured against a side of said pocket by said groove, said plate having a plurality of bars integrally formed on one side of said plate forming a spaced array extending across said floor; and the rack holding a plurality of the recording media insertable between said bars.

15. The apparatus of claim 14, further comprised of said slots adapted to precisely fit said recording media and having a depth that prevents said recording media from falling from said monitor when said monitor is adjusted.

16. The apparatus of claim 14, further comprising the recording media to be held in said rack being laterally movable inside of said pocket.

17. The apparatus of claim 14, with said two plates being changeable with another set of plates to change a spacing interval between said bars.

18. A video monitor, comprising:

a housing exhibiting an aperture forming a bezel oriented to encase and expose a video screen;

said housing providing a plurality of exterior surfaces defining a floor adjoining said bezel, with a first surface among said exterior surfaces having a first edge separated by a width of said first surface from a second edge; and said first surface bearing a plurality of fingers extending in a spaced array across said floor from said first edge while defining an array of discrete slots within said first surface that are separated by intermediate ones of said fingers.

19. The monitor of claim 18, comprised of said plurality of fingers extending from said first edge, said plurality of fingers being terminated by said second edge.

20. The monitor of claim 18, comprised of said plurality of fingers extending from said first edge and terminating at said second edge, with said plurality of slots extending through said second edge.

21. The monitor of claim 18, comprised of:

a recess formed within said first surface; and an elongate member having a length that is insertable into said recess to form said first edge, with said plurality of fingers being spaced apart along said length to extend transversely from and being borne by said elongate member.

22. The monitor of claim 21, comprised of a second member having a length that is insertable into said recess to define said second edge, and having a different plurality of fingers spaced-apart along said length of said second member to extend toward said elongate member and cooperate with said defining of said slots.

23. The monitor of claim 18, comprised of said first surface containing a central region with said first edge defining one dimension of said central region and said plurality of fingers dividing said central region into said array of slots.

24. The monitor of claim 23, comprised of said second edge defining another dimension of said central region and terminating said plurality of slots.

25. The monitor of claim 23, comprised of said second edge defining another dimension of said central region while being perforated by each of said array of slots.

26. The monitor of claim 23, comprised of said central region comprising a recess within said first surface, an elongate member having a length that is insertable into said recess to form said first edge, with said plurality of fingers being spaced-apart along said length while borne by said elongate member to extend transversely from said elongate member and toward said second edge.

27. The monitor of claim 26, comprised of a second member having a length that is insertable into said recess to provide a definition with said second edge, and having a different plurality of fingers spaced-apart along said length of said second member to extend toward said elongate member and cooperate with said definition of said slots.

* * * * *